United States Patent
Lehtonen

(10) Patent No.: US 9,463,752 B1
(45) Date of Patent: Oct. 11, 2016

(54) PURSE SECURING DEVICE

(71) Applicant: Donna L. E. Lehtonen, Naples, FL (US)

(72) Inventor: Donna L. E. Lehtonen, Naples, FL (US)

(*) Notice: Subject to any disclaimer, the term of this patent is extended or adjusted under 35 U.S.C. 154(b) by 0 days.

(21) Appl. No.: 15/071,277

(22) Filed: Mar. 16, 2016

(51) Int. Cl.
*B60R 7/04* (2006.01)
*B60R 11/00* (2006.01)
*B60N 2/44* (2006.01)

(52) U.S. Cl.
CPC ........ *B60R 11/00* (2013.01); *B60N 2002/4405* (2013.01); *B60R 7/043* (2013.01); *B60R 2011/0017* (2013.01); *B60R 2011/0059* (2013.01); *B60R 2011/0063* (2013.01)

(58) Field of Classification Search
CPC . B60R 7/04; B60R 7/043; B60R 2011/0017; B60R 2011/0059
USPC .................. 224/275, 257, 258, 925
See application file for complete search history.

(56) References Cited

U.S. PATENT DOCUMENTS

| | | | | |
|---|---|---|---|---|
| 910,238 A | * | 1/1909 | Shaw | A45F 3/14 224/257 |
| 4,125,211 A | * | 11/1978 | Handsman | A45F 5/00 224/255 |
| 5,044,538 A | * | 9/1991 | Bader | A45F 3/14 224/250 |
| 5,104,076 A | | 4/1992 | Goodall | |
| 5,383,588 A | | 1/1995 | Kazel | |
| 5,425,485 A | * | 6/1995 | Carlo | A45F 3/14 224/250 |
| 5,483,860 A | * | 1/1996 | Adams | G10G 5/005 224/257 |
| 5,749,325 A | * | 5/1998 | Albanese | A01K 1/04 119/792 |
| 6,260,748 B1 | * | 7/2001 | Lindsey | F41C 33/001 224/150 |
| 6,378,746 B1 | * | 4/2002 | Miller | A47D 13/02 224/158 |
| 6,606,768 B2 | * | 8/2003 | Henry | A45F 5/00 24/298 |
| 6,966,470 B1 | | 11/2005 | Charlton | |
| 7,841,453 B2 | | 11/2010 | Gold | |
| D658,113 S | * | 4/2012 | Henderson | D12/416 |
| 8,875,965 B2 | * | 11/2014 | Corets | B60R 7/043 224/666 |
| 9,102,276 B1 | * | 8/2015 | Virgin | B60R 7/043 |
| 9,199,580 B2 | * | 12/2015 | Lehtonen | B60R 7/043 |
| 2002/0008125 A1 | * | 1/2002 | Caputi | A45C 13/30 224/257 |
| 2003/0121944 A1 | | 7/2003 | Scanlan | |
| 2008/0035687 A1 | * | 2/2008 | Beaulieu | B60R 7/043 224/275 |
| 2008/0073948 A1 | * | 3/2008 | Livingston | A45C 13/30 297/188.2 |
| 2011/0248057 A1 | * | 10/2011 | Schmitz | A45C 3/04 224/275 |
| 2013/0229045 A1 | * | 9/2013 | Agustin | B60R 7/043 297/463.1 |
| 2015/0298619 A1 | * | 10/2015 | Parisi | B60R 11/00 224/275 |

FOREIGN PATENT DOCUMENTS

| | | | | | |
|---|---|---|---|---|---|
| DE | 102004056361 A1 | * | 7/2006 | ............ | B60R 7/043 |
| GB | 2254363 A | * | 10/1992 | ............ | B60R 7/04 |
| GB | 2404905 A | * | 2/2005 | ............ | B60R 7/043 |
| JP | 11099884 A | * | 4/1999 | | |
| JP | 20010347891 A | * | 12/2001 | | |
| JP | 2002036959 A | * | 2/2002 | | |
| JP | 2002067811 A | * | 3/2002 | | |
| JP | 2003335177 A | * | 11/2003 | | |

* cited by examiner

*Primary Examiner* — Justin Larson
(74) *Attorney, Agent, or Firm* — Livingston Loeffler, P.A.; Edward M. Livingston, Esq.; Bryan L. Loeffler, Esq.

(57) ABSTRACT

A purse securing device (1) having straps (4,5,6) with mechanical fasteners (13) that attach to head rest posts (10) or a rear portion of a seat in a vehicle and then wraps around handles (17) of a purse (3) or hand bag to prevent theft.

17 Claims, 3 Drawing Sheets

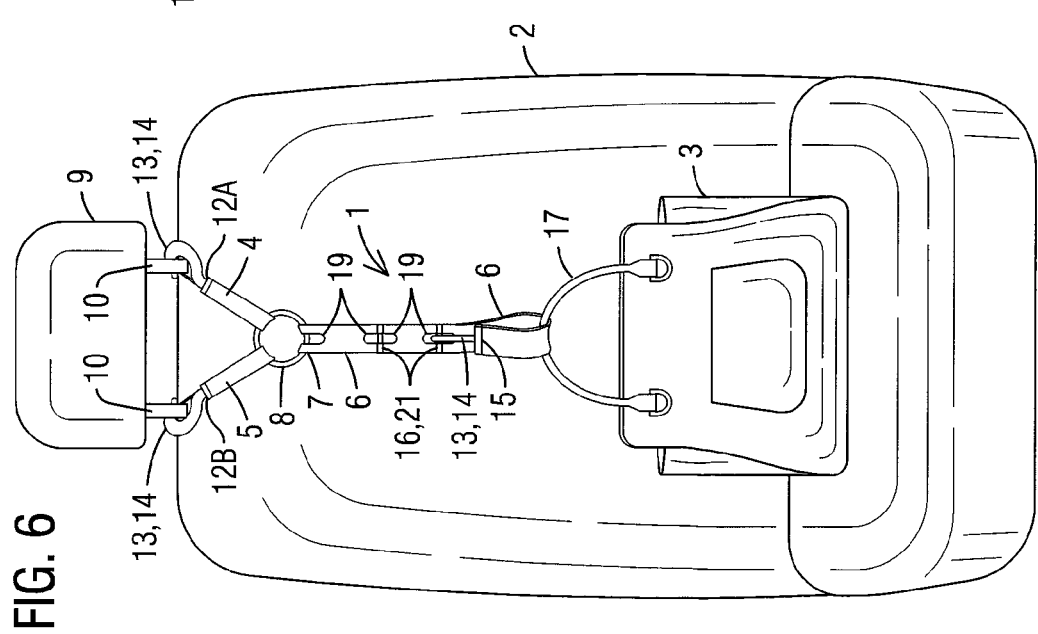
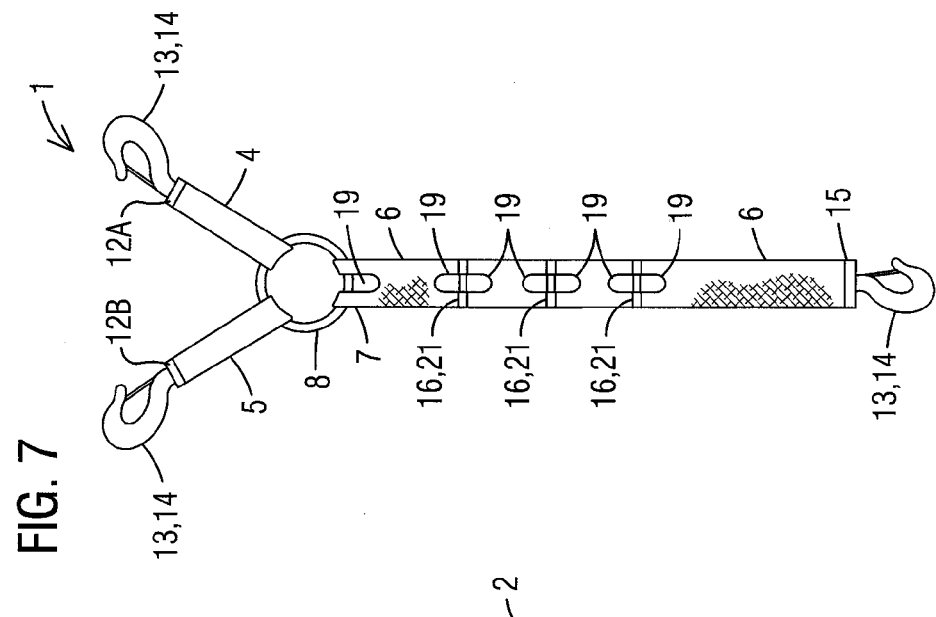
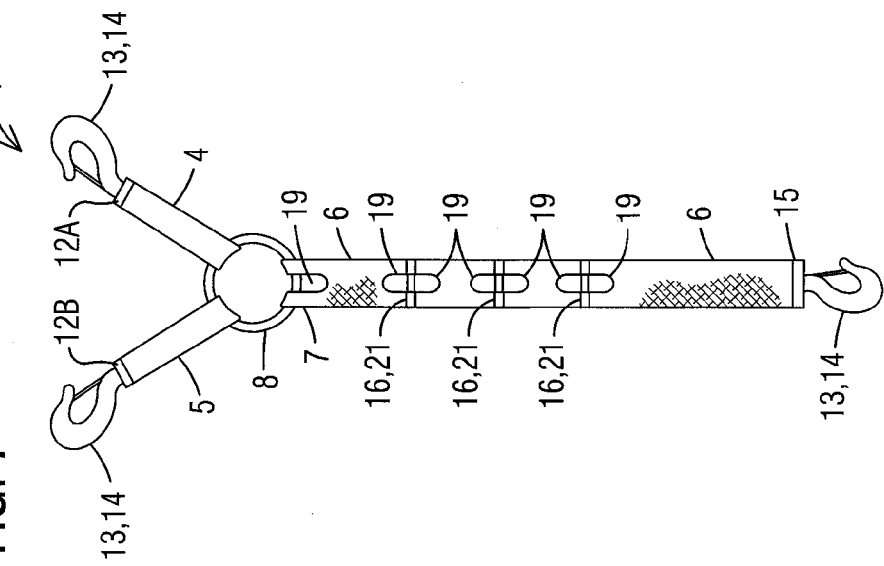

PURSE SECURING DEVICE

FIELD OF THE INVENTION

This invention relates to purses and hand bags, and more particularly, a device to secure a purse from sliding off of a seat of a vehicle onto the floorboard or tipping over on a seat and spilling the contents of the purse and to prevent thieves from reaching into a vehicle and snatching and stealing a purse that is resting on a car seat.

BACKGROUND OF THE INVENTION

Purses and handbags have always been a convenient and preferred method for females to carry and transport personal items. When females drive, they normally keep their purses on the passenger seat next them. If the bag is open and the driver makes a quick stop the purse will tip over and/or slide off the seat, thereby causing the contents of the purse to be spilled.

Another problem is with purses being stolen from vehicles. Thieves find purses sitting on car seats to be easy targets by reaching into open windows at snatching the purse off of the seat. This occurs in parking lots, gas stations and even at stop lights. This also commonly occurs at gas stations where thieves will sneak up to a vehicle at a gas pump, open a passenger side door and snatch a purse right off of the seat while the owner is distracted pumping gas.

Therefore, a need exists for an invention that will secure a purse to prevent it from tipping over or falling on the floorboard of a vehicle while driving and prevent thieves from freely grabbing the purse out of a vehicle.

SUMMARY OF THE INVENTION

The primary object of the present invention is to provide a purse securing device that secures a purse a seat of a vehicle to prevent it from tipping over or falling on the floorboard of a vehicle while driving An additional object of the present invention is to provide a purse securing device that prevents thieves from freely grabbing a purse out of a vehicle.

The present invention fulfills the above and other objects by providing a purse securing device having straps with mechanical fasteners that attach to head rest posts or a rear portion of a seat in a vehicle and then wraps around handles of a purse or hand bag. The purse securing device preferably has hardware located thereon, such as snap hooks, carabiners, locking clips, O-rings, bars and so forth, that secure and lock the straps to the head rest and to the purse to prevent theft.

The present invention may also be used with other items, such as briefcases, camera cases, diaper bags, fragile packages, grocery bags, shopping bags and so forth. In addition the present invention may be used to secure items in the front seat or the rear seats of a vehicle. An additional benefit of the present invention is its use in convertible vehicles to prevent items from flying out of the vehicle while in transit and thieves from reaching into the open vehicle and a purse or other item out of the vehicle.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which:

FIG. 6 is a perspective view of a purse securing device of the present invention attached to a vehicle seat and a purse wherein the attachment points located along the length of the purse attachment strap are horizontal bars;

FIG. 7 is a front view of a purse securing device of the present invention wherein the attachment points located along the length of the purse attachment strap are horizontal bars; and FIG. 8 is a front view of the present invention of the present invention, respectively, wherein the attachment points located along the length of the purse attachment strap are loops shaped like D rings.

DESCRIPTION OF THE PREFERRED EMBODIMENTS

Figure 2:
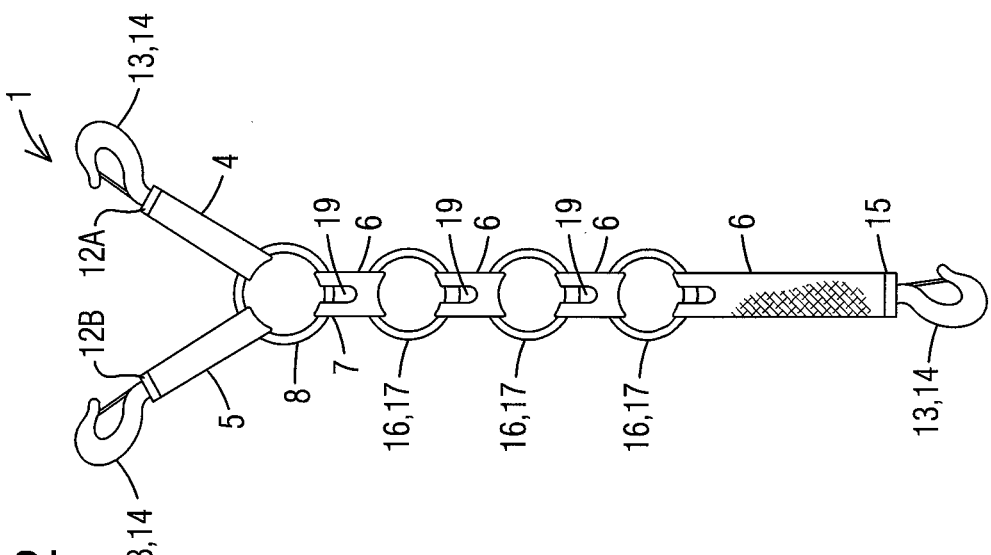
FIG. 2 is a front view of a purse securing device of the present invention wherein the attachment points located along the length of the purse attachment strap are linked rings.
Figure 1:
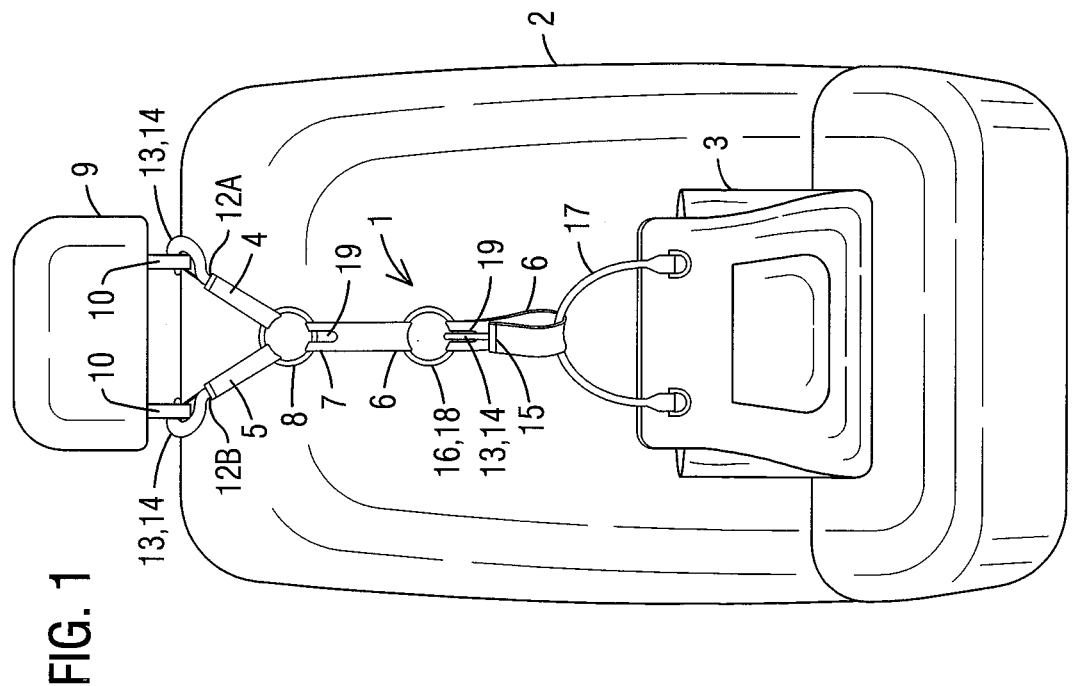
FIG. 1 is a perspective view of a purse securing device of the present invention attached to a vehicle seat and a purse wherein the attachment points located along the length of the purse attachment strap are linked rings.

For purposes of describing the preferred embodiment, the terminology used in reference to the numbered components in the drawings is as follows:

1. purse securing device, generally
2. vehicle seat
3. purse
4. right seat attachment strap
5. left seat attachment strap
6. purse attachment strap
7. upper end of purse attachment strap
8. junction ring
9. head rest
10. head rest post
11. rear portion of vehicle seat
12A. distal end of right seat attachment strap
12B. distal end of left seat attachment strap
13. mechanical fastening means
14. snap hook
15. lower end of purse attachment strap
16. attachment point
17. purse handle
18. linked ring
19. notch
20. loop
21. horizontal bar
22. extension strap
23. distal end of extension strap With reference to FIGS. 1-8, a view of a purse securing device 1 of the present invention attached to a vehicle seat 2 and a purse 3, a front view of the present invention of the present invention, respectively, is illustrated. The purse securing device 1 comprises a right seat attachment strap 4 and a left seat attachment strap 5 that each extend from an upper end 7 of a vertically hanging purse attachment strap 6 at opposing angles to create a substantially Y-shaped configuration. The right seat attachment strap 4 and left seat attachment strap 5 may extend directly from the upper end 7 of a purse attachment strap 6 or be attached to the attached to the upper end 7 of a purse attachment strap 6 via a junction ring 8, as illustrated in FIG. 1, to which each may be slidably attached. The junction ring 8 may be of any shape, such as circular, triangular and so forth, that will allow the right seat attachment strap 4 and a left seat attachment strap 5 to be secured to the seat. The junction ring 8 allows the angles of the right seat attachment strap 4 and left seat attachment strap 5 to be adjusted according to the width of the head rest 9, head rest posts 10, and/or rear portion 11 of the vehicle seat 2 to which distal ends 12A, 12B of the right seat attachment strap 4 and left seat attachment strap 5 are being attached.

One or more mechanical fastening means 13, such as a snap hook 14, an s-shaped hook, a spiral-shaped hook and so forth, are located on the distal ends 12A, 12B of the right seat attachment strap 4 and left seat attachment strap 5 to secure the purse securing device 1 the head rest 9, head rest posts 10, and/or rear portion 11 of the vehicle seat 2. The one or more mechanical fastening means 13 are preferably swiveling and made of a rigid material.

A mechanical fastening means 13, such as a snap hook 14 an s-shaped hook, a spiral-shaped hook and so forth, is located on a lower end 15 of the purse attachment strap 6 and is used to secure the lower end 15 of the purse attachment strap 6 to one or more attachment points 16 located along the length of the purse attachment strap 6 to create a loop around one or more purse handles 17. The mechanical fastening means 13 is preferably swiveling and made of a rigid material.

With specific reference to FIGS. 1 and 2, a view of a purse securing device 1 of the present invention attached to a vehicle seat 2 and a purse 3 and a front view of the present invention of the present invention, respectively, wherein the attachment points 16 located along the length of the purse attachment strap 6 are linked rings 18 are illustrated. The linked rings 18 link or hold together two or more pieces of the purse attachment strap 6. The linked rings 18 and the junction ring 8 allow a user to place the lower end 15 of the purse attachment strap 6 through one or more purse handles 17 and then to fold the purse attachment strap 6 upward back onto itself and to lock the lower end 15 of the purse attachment strap 6 onto itself by locking the mechanical fastening means 13 or snap hook 14 onto one of the linked rings 18 or the junction ring 8. The multiple attachment points 16 and the junction ring 8 allow the size of the loop created to be adjusted and thus, the length of purse securing device 1 to accommodate the size of the purse being secured in place. Notches 19 are located between the purse attachment strap 6 and the linked rings 18 and the junction ring 8 to provide clearance for the snap hook 14 to attach to the linked rings 18 and the junction ring 8 in a perpendicular manner.

Figure 5:
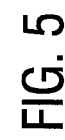
FIG. 5 is a cutaway side view of line A-A of FIG. 5.
Figure 4:
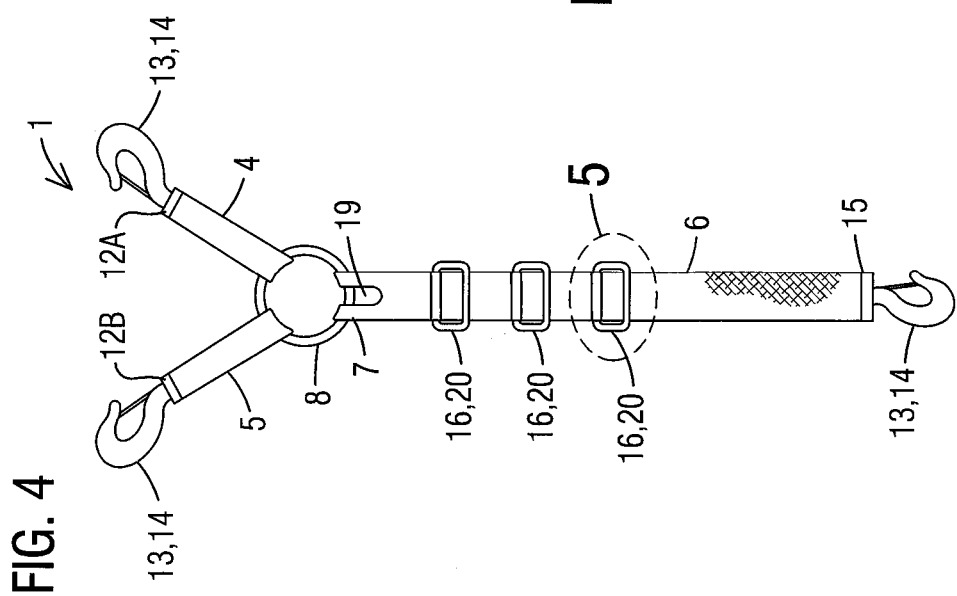
FIG. 4 is a front view of a purse securing device of the present invention wherein the attachment points located along the length of the purse attachment strap are loops.
Figure 3:
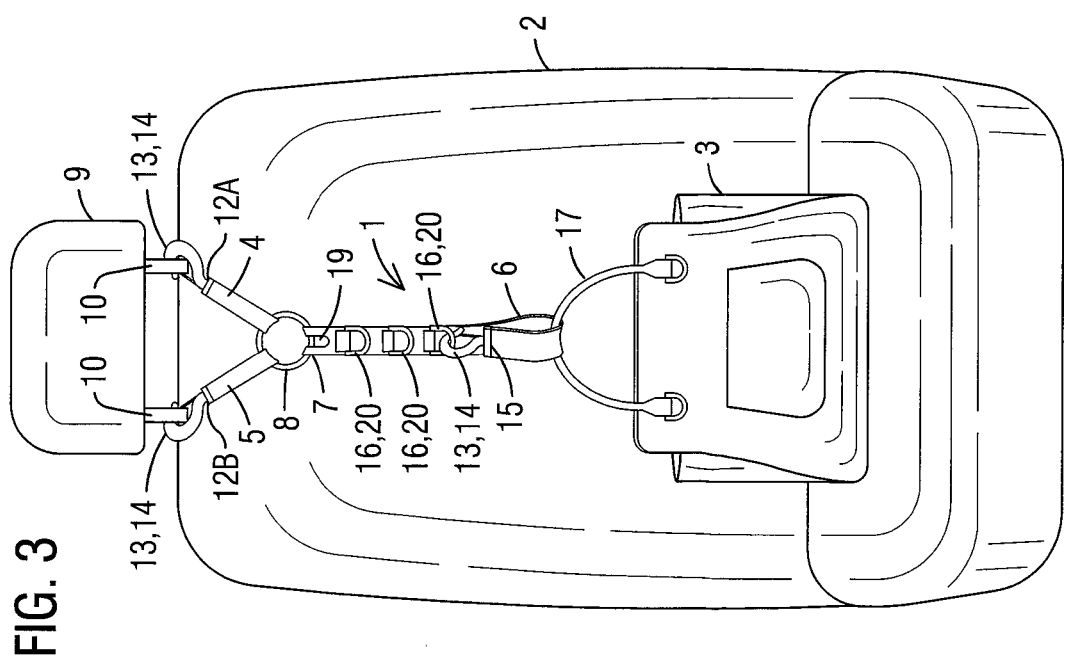
FIG. 3 is a perspective view of a purse securing device of the present invention attached to a vehicle seat and a purse wherein the attachment points located along the length of the purse attachment strap are loops.

With specific reference to FIGS. 3-5, a view of a purse securing device 1 of the present invention attached to a vehicle seat 2 and a purse 3 and a front view of the present invention of the present invention, respectively, wherein the attachment points 16 located along the length of the purse attachment strap 6 are loops 20 are illustrated. The loops 20 and the junction ring 8 allow a user to place the lower end 15 of the purse attachment strap 6 through one or more purse handles 17 and then to fold the purse attachment strap 6 upward back onto itself and to lock the lower end 15 of the purse attachment strap 6 onto itself by locking the mechanical fastening means 13 or snap hook 14 onto one of the loops 20 or the junction ring 8. The multiple attachment points 16 and the junction ring 8 allow the size of the loop created to be adjusted and thus, the length of purse securing device 1 to accommodate the size of the purse being secured in place. The loops 20 are preferably pivotably attached to the purse attachment strap 6, as illustrated in FIG. 5, to allow the loops 20 to lay flat when not in use so that a passenger may sit against the purse securing device 1 without any discomfort. The loops 20 may be circular-shaped, D rings, triangular-shaped, rectangular-shaped and so forth.

With specific reference to FIGS. 6 and 7, a view of a purse securing device 1 of the present invention attached to a vehicle seat 2 and a purse 3 and a front view of the present invention of the present invention, respectively, wherein the attachment points 16 located along the length of the purse attachment strap 6 are horizontal bars 21 are illustrated. The horizontal bars 21 and the junction ring 8 allow a user to place the lower end 15 of the purse attachment strap 6 through one or more purse handles 17 and then to fold the purse attachment strap 6 upward back onto itself and to lock the lower end 15 of the purse attachment strap 6 onto itself by locking the mechanical fastening means 13 or snap hook 14 onto one of the horizontal bars 21 or the junction ring 8. The multiple attachment points 16 and the junction ring 8 allow the size of the loop created to be adjusted and thus, the length of purse securing device 1 to accommodate the size of the purse being secured in place. Notches 19 are located between the purse attachment strap 6 and the horizontal bars 21 and the junction ring 8 to provide clearance for the snap hook 14 to attach to the horizontal bars 21 and the junction ring 8 in a perpendicular manner.

With specific reference to FIG. 8, a front view of the present invention of the present invention, respectively, wherein the attachment points 16 located along the length of the purse attachment strap 6 are loops 20 shaped like D rings are illustrated. The loops 20 and the junction ring 8, which is triangular-shaped, allow a user to place the lower end 15 of the purse attachment strap 6 through one or more purse handles 17 and then to fold the purse attachment strap 6 upward back onto itself and to lock the lower end 15 of the purse attachment strap 6 onto itself by locking the mechanical fastening means 13 or snap hook 14 onto one of the loops 20 or the junction ring 8. The multiple attachment points 16 and the junction ring 8 allow the size of the loop created to be adjusted and thus, the length of purse securing device 1 to accommodate the size of the purse being secured in place. The loops 20 are preferably pivotably attached to the purse attachment strap 6 to allow the loops 20 to lay flat when not in use so that a passenger may sit against the purse securing device 1 without any discomfort. An extension strap 22 is provided and is removably attachable to the lower end 15 of the purse attachment strap 6 via a mechanical fastening means 13 and/or additional loop 20 (which as illustrated here is triangular) or combination thereof. A mechanical fastening means 13 or snap hook 14 is located on a distal end 23 of the extension strap 22. The extension strap 22 may stay attached to a purse or other object and then used to secure the purse when not in the vehicle, such as to a shopping cart or chair.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A purse securing device for securing a purse to a vehicle seat comprising:
   a right seat attachment strap and a left seat attachment strap each extending from an upper end of a vertically hanging purse attachment strap at opposing angles to create a substantially Y-shaped configuration with the purse attachment strap;
   a mechanical fastening means located on a distal end of the right seat attachment strap;
   a mechanical fastening means located on a distal end of the left seat attachment strap;
   a mechanical fastening means located on a lower end of the purse attachment strap; and
   at least one attachment point located on the purse attachment strap; wherein said right seat attachment strap and said left seat attachment strap are attached to said upper end of said purse attachment strap via a junction ring; and wherein at least one notch is located between said purse attachment strap and said junction ring.

2. The purse securing device of claim 1 wherein:
   said mechanical fastening means located on the distal end of the right seat attachment strap is a snap hook;
   said mechanical fastening means located on the distal end of the left seat attachment strap is a snap hook; and
   said mechanical fastening means located on the lower end of the purse attachment strap is a snap hook.

3. The purse securing device of claim 1 wherein:
   said at least one attachment point is at least one bar.

4. The purse securing device of claim 1 further comprising:
   an extension strap removably attached to the purse securing strap.

5. The purse securing device of claim 1 wherein:
   said at least one attachment point is at least one linked ring.

6. The purse securing device of claim 5 further comprising:
   at least one notch is located between the purse attachment strap and the linked ring.

7. The purse securing device of claim 1 wherein:
   said at least one attachment point is at least one loop.

8. The purse securing device of claim 7 wherein:
   the at least one loop is pivotably attached to the purse attachment strap.

9. A purse securing device for securing a purse to a vehicle seat comprising:
   a right seat attachment strap and a left seat attachment strap each extending from an upper end of a vertically hanging purse attachment strap at opposing angles to create a substantially Y-shaped configuration with the purse attachment strap;
   said right seat attachment strap and left seat attachment strap are attached to the upper end of the purse attachment strap via a junction ring;
   a mechanical fastening means located on a distal end of the right seat attachment strap;
   a mechanical fastening means located on a distal end of the left seat attachment strap;
   a mechanical fastening means located on a lower end of the purse attachment strap; wherein at least one notch is located between said purse attachment strap and said junction ring.

10. The purse securing device of claim 9 wherein:
    said mechanical fastening means located on the distal end of the right seat attachment strap is a snap hook;
    said mechanical fastening means located on the distal end of the left seat attachment strap is a snap hook; and
    said mechanical fastening means located on the lower end of the purse attachment strap is a snap hook.

11. The purse securing device of claim 4 further comprising:
    an extension strap removably attached to the purse securing strap.

12. The purse securing device of claim 9 further comprising:
    at least one attachment point located on the purse attachment strap.

13. The purse securing device of claim 12 wherein:
    said at least one attachment point is at least one bar.

14. The purse securing device of claim 12 wherein:
    said at least one attachment point is at least one linked ring.

15. The purse securing device of claim 14 further comprising:
    at least one notch is located between the purse attachment strap and the linked ring.

16. The purse securing device of claim 12 wherein:
    said at least one attachment point is at least one loop.

17. The purse securing device of claim 16 wherein:
    the at least one loop is pivotably attached to the purse attachment strap.

* * * * *